United States Patent
McGwire et al.

[15] 3,694,628
[45] Sept. 26, 1972

[54] FLEXIBLE HEATING UNIT WITH SEPARATELY REPLACEABLE HEATING ELEMENTS

[72] Inventors: Thomas A. McGwire, Pelham Manor, N.Y.; Emilio A. Racinez, Union City, N.J.

[73] Assignee: Industrial Heater Co., Inc., New York, N.Y.

[22] Filed: Dec. 14, 1971

[21] Appl. No.: 207,737

[52] U.S. Cl. ............... 219/550, 174/88 S, 174/111, 219/535, 219/542, 338/213
[51] Int. Cl. .............................................. H05b 3/02
[58] Field of Search......219/213, 532, 535, 536, 542, 219/550, 549, 552; 338/213, 214; 174/111, 138, 84 S, 88 S

[56] References Cited

UNITED STATES PATENTS

| | | |
|---|---|---|
| 2,549,944 | 4/1951 | Steiner.....................219/550 |
| 2,722,597 | 11/1955 | Steiner...................338/213 X |
| 3,036,187 | 5/1962 | Goldstaub et al......219/542 X |
| 3,045,097 | 7/1962 | Sellers..................219/542 X |
| 3,045,098 | 7/1962 | Northon....................219/535 |

FOREIGN PATENTS OR APPLICATIONS

| | | |
|---|---|---|
| 358,182 | 10/1931 | Great Britain.............219/550 |
| 817,775 | 10/1951 | Germany...................338/213 |

Primary Examiner—Volodymyr Y. Mayewsky
Attorney—Howard E. Thompson, Jr.

[57] ABSTRACT

An elongated flexible heating unit for spiral wrapping around items to be annealed or heat treated contains a plurality of heating elements in parallel circuit so that a heat treating cycle may be carried to completion even if there should be failure of an individual heating element. Novel junction boxes at opposed ends of the heating unit facilitate both easy coupling to available sources of electrical power and easy replacement of individual heating elements. Articulating spacer and protective elements longitudinally of the unit are of heat conducting ceramic material throughout the major portion of the length of the unit and of heat insulating ceramic in the lead portions adjacent the junction boxes.

10 Claims, 5 Drawing Figures

PATENTED SEP 26 1972

3,694,628

INVENTORS
THOMAS A. McGWIRE
BY EMILIO A. RACINEZ

ATTORNEY though the surfaces of the articulating ceramic bodies may be written

FLEXIBLE HEATING UNIT WITH SEPARATELY REPLACEABLE HEATING ELEMENTS

This invention relates to improved heating units of the flexible type adapted to be wrapped around welded pipe joints and other zones of welding for preconditioning and subsequent annealing and/or stress relief of weld areas, and particularly to elongated heating units adapted to be applied to a zone for heat treating in a multi-spiral wrap. More particularly, the invention relates to an elongated flexible heating unit having a plurality of individually removable heating elements in parallel circuit to facilitate both completion of a heat treating cycle in spite of failure of individual heating elements and easy replacement of damaged or defective heating elements.

It has long been known that effective welding of metals in pipe lines, machinery and equipment and other metal structural assemblages frequently calls for controlled heating of the weld zone before, during and after welding in what is referred to in the trade as preheating and stress relieving controls. For this purpose, it has been customary to use various forms of heating mats and bands which can be conformed to the particular weld zone with electrical resistance heating elements interlaced therethrough to provide a heating pattern of considerable area. In such heating units the mat or band structure generally employs a lay of heating element which permits a one point coupling with a source of electrical power. This means that if there is a break or failure in the heating element, the entire area of the mat or band becomes inoperative; and if this happens during the course of a heating cycle, it can necessitate a repeating of the complete cycle.

Some conventional mats or bands support the interlaced heating element in a metallic weave which necessarily provides differential spacing of the heating element from the item to be heated with resulting inefficiency as a heat source. Other available heating units lace the heating element through cylindrical members or beads which provide limited surface contact with the item to be heated, and therefore show limited heating efficiency.

The new heating unit in accordance with the present invention overcomes the various disadvantages in the prior art devices above mentioned, and provides great flexibility in use by adapting a single type unit to use in many varied heat treating operations. The new heating unit of the present invention can suitably be about 2 to 3 inches wide and can be made up in various practical lengths such as 20 feet, 30 feet, 40 feet and longer, depending upon the size area to be heat treated. By way of illustration, a 20 foot unit 2 inches wide would provide approximately eight turns, or a heating zone 16 inches long, along a 10 inch O.D. pipe or two full turns providing a heating zone 4 inches wide around a piece of equipment having an outside diameter of about 3.2 feet. In the latter instance a plurality of juxtaposed units might be needed to provide a heating zone of desired width.

The new heating unit of the present invention employs a plurality of elongated heating elements in parallel circuit with the heating elements laced through aligned apertures in articulating ceramic bodies having high heat conductivity. When three or more heating elements are employed in parallel, there can be failure of one of the elements during a heat treating cycle and residual heating capacity of the remaining elements coupled with the heat transfer characteristics of the articulating members will permit the heating cycle to be completed without interruption.

The ceramic bodies are of elongated structure extending the full width of the unit, generally about 2 to 3 inches, and are of generally similar dimension longitudinally of and perpendicularly to the heating elements. They have interfitting curved abutting surfaces providing great longitudinal flexibility in the unit. The surfaces parallelling the heating elements can be flat or slightly concave so that as the unit is wrapped around a structure to be heat treated there will be very closely spaced lines or zones of direct contact between the ceramic bodies and said structure. Articulating ceramic bodies of this general structure have been employed in other type heating devices as disclosed in U.S. Pat. No. 2,549,944.

The parallel orientation and hookup of the multiple heating elements is provided by novel terminal blocks or junction boxes having individual and readily actuated anchoring means for the several heating elements, and also readily detachable means for establishing electrical communication between the heating elements and a power supply. Unlike conventional heating units having essentially a one point supply of electrical power, the new heating unit will have separate leads running from the opposite ends thereof to a particular power source.

The heating elements can have electrical resistance characteristics adapting them to any desired power source including, for example, the 40–80 volt power supplies characteristic of much of the available welding equipment. To provide the desired combination of flexibility and strength the heating elements are preferably of the conventional coaxial type having a flexible nichrome heating core and an outer sheath comprising coiled or woven high temperature wire.

While the main portion of the length of a heating unit will include the highly heat conductive articulating ceramic bodies above mentioned, the end portions adjacent the coupling blocks are preferably ceramic bodies of a relatively high heat insulating type, and the coupling blocks are fashioned of essentially heat insulating material so that in spite of high temperatures of the order of 1,000°–1,200°F. and higher in the main portion of the unit, the coupling blocks will nevertheless remain relatively cool.

In using heating elements in accordance with the present invention, the desired length of heating element is wrapped around the pipe or other equipment to be heat treated and covered with insulating material to retain the heat in the usual manner, with the lead ends of the unit above mentioned projecting outwardly of such insulating material to further protect the coupling ends from the zone of heating. As with other heating units of the general type, a plurality of units can generally be operated from a single power source and suitably utilized in conjunction with automatic monitoring or control systems which are available on the market and which permit the presetting and automatic control of temperatures and temperature changes desired in a heat treating cycle.

Details of the new heating unit in accordance with the present invention will be more fully understood from a consideration of the following description having reference to the accompanying drawing in which a preferred embodiment of the invention is disclosed with the various parts thereof identified by suitable reference characters in each of the views in which.

Figure 1:
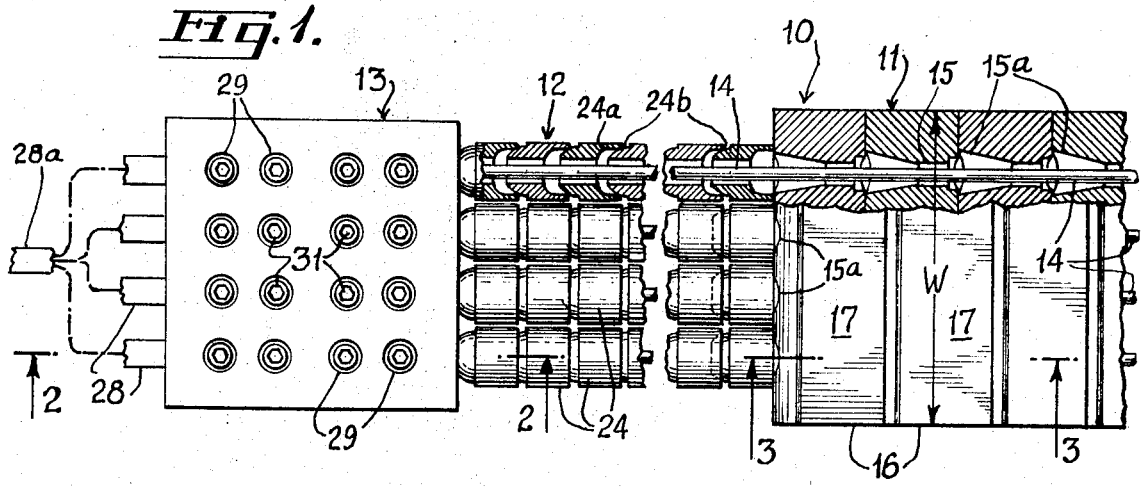
FIG. 1 is a plan view of one end portion of a heating unit in accordance with the present invention showing the general structural relationship between the heating section of the unit, a terminal junction box and the heat insulated section extending therebetween.

The illustration in the drawing shows one end portion of a heating unit 10 in accordance with the present invention, including a small section of the heating portion 11, a flexible connecting and heat insulated portion 12 and a junction box 13. In order to better visualize the overall unit, it should be noted that, in an actual device, the width W of the heating portion 11 might be about 2 ½ inches and the length of the heating section 11 between two similar end portions might vary from about ten to 20 feet in a small unit, to 40 feet or more in a large unit. Also with variations in length, it will be understood that the width W may frequently be varied within the range of about 2 inches to 4 inches; and for special purposes, the device can be constructed in sizes beyond the preferred ranges noted above.

The heating unit is made up of three or more flexible heating elements 14 (four being present in the structure as illustrated) in parallel circuit. Various types of conventional flexible heating elements can be employed including, in particular, elements comprising flexible nichrome resistance wire.

Figure 3:
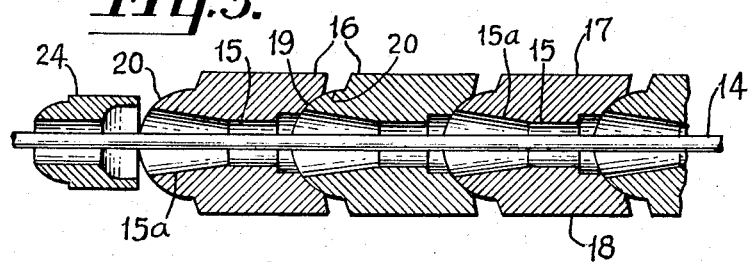
FIG. 3 is an enlarged sectional view substantially on the line 3—3 of FIG. 1.
Figure 4:
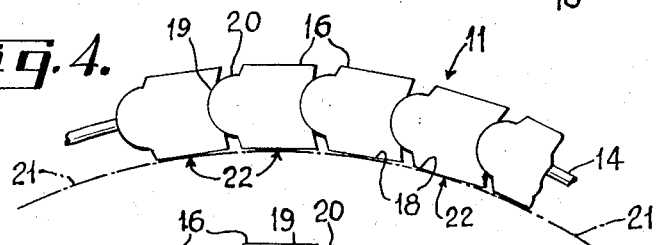
FIG. 4 is a fragmentary end view, similar to FIG. 3, showing the unit oriented for engagement with a large radius structure.
Figure 5:
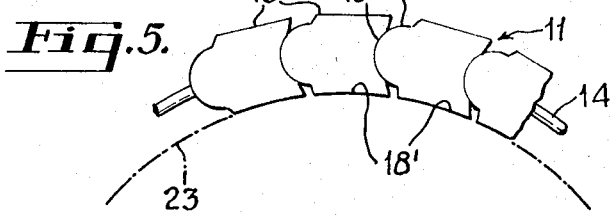
FIG. 5 is a view, similar to FIG. 4, showing a slight modification as oriented for engagement with a relatively small diameter structure.

In the heating portion of the unit, the heating elements 14 pass through spaced apertures 15 in elongated ceramic blocks 16, in which the ceramic composition is selected for its high heat conducting properties. As noted in FIG. 3, inner and outer faces 17, 18 of the blocks 16 are substantially parallel to each other, while one apertured surface 19 has a concave curvature and the opposed apertured surface 20 has a correspondingly convex curvature, so as to provide relative sliding movement between juxtaposed members 16 in the flexing of the unit to position such as shown in FIGS. 4 and 5. To further facilitate this flexing, the apertures 15 may be slightly flared at the ends thereof, as seen at 15a in FIG. 3.

When the length of the unit 10 is spirally wrapped around a pipe or other structure to be heat treated, it will be noted that, with larger diameter pipes or bodies 21 as diagrammatically indicated in FIG. 4, flat surfaces 18 on the members 16 will provide line contacts 22 between each of the members 16 and the structure 21 with adjacent portions of the surfaces 18 in very close proximity to the structure 21. This provides a very uniform type heat transfer between the flexed unit 11 and the structure 21. With smaller diameter structures, such as diagrammatically illustrated at 23 in FIG. 5, the contact lines 22 would be slightly closer together, due to greater flexing in the unit 11, but with flat surfaces 18 there would also be greater spacing between such surfaces and the structure 23 at points removed from the contact points 22. In such instances, it can be beneficial to substitute for the planar surfaces 18 slightly concave surfaces 18' to more closely conform to the curvature of smaller radius structures, such as 23. In this connection, it should be understood that full surface contact between the members 16 and the structures 21 or 23 being heat treated is not essential, but where heating units are intended to be used extensively with small diameter structures, the provision of appropriately concave surfaces 18' on at least one side of the unit can provide a significant advantage in heating efficiency.

Figure 2:
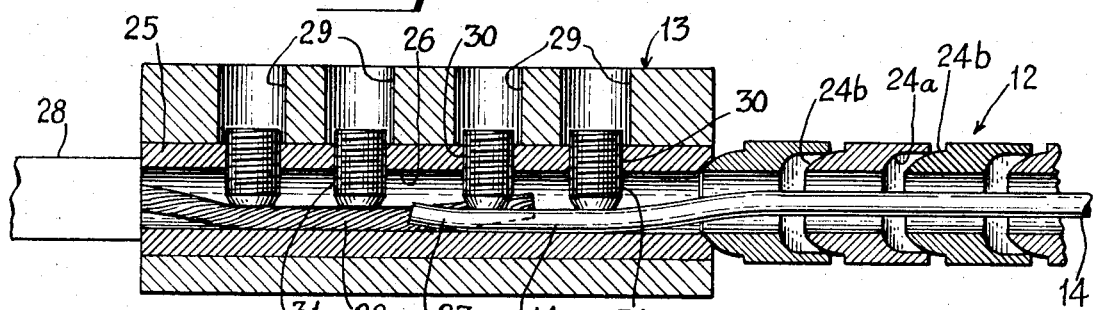
FIG. 2 is an enlarged sectional view substantially on the line 2—2 of FIG. 1.

As shown in FIGS. 1 and 2, the heating elements 14, as they extend beyond the heating portion 11, are enveloped by a series of bead-like cylindrical ceramic bodies 24 having heat insulating properties and having opposed concave and convex surfaces 24a, 24b providing flexibility in the lead portion 12 of the unit which connects the same with junction box 13. As is conventional in connection with welding and other heat treating operations, the spirally wrapped heating portion 11 will be enveloped with layers of insulating material to retain and concentrate the generated heat and the lead portion 12 will pass out through folds of such insulation to expose the junction box 13 in an essentially cool environment. The individual envelopment of heating elements 14 in the bead-like members 24 serves the dual purpose of facilitating the cooling of the lead portion 12 and also facilitating independent flexing of the heating elements 14 when adjustment and repair may be needed, as hereinafter described.

The junction box 13 comprises a block of heat insulating material having a plurality of tubular electrically conductive metal inserts 25 extending therethrough, four such inserts being present in the structure as shown. The inner diameter 26 of each tubular insert is sufficiently large to permit a zone of overlap 27 between the heating element 14 and an electrical lead 28 within said tubular insert.

The outer surface of the block 13 is provided with three or more recesses 29 extending perpendicularly to and in axial alignment with each of the tubular inserts 25 (four such recesses 29 being shown in alignment with each tubular insert).

Registering with each recess 29 is a coaxial threaded aperture 30 extending through the tubular members 25 and receiving a threaded anchoring member 31. The anchoring members 31 can be Allen bolts or other grooved or recessed members with the upper ends thereof accessible through but concealed within the recesses 29.

In use of the junction box as shown, it will be apparent that the anchoring members 31 at the extremities of the tubular member 25 will engage either the electric lead 28 or the heating element 14; whereas at least one, and generally both, of the centrally located members will act against overlapped portions of the lead and heating element. It should be noted, however, that overlapping of the parts is not essential, since full electrical connection is provided by the clamping of the electric lead and heating element to the electrically conductive insert 25.

The several leads 28 are joined together, as diagrammatically shown at 28a in FIG. 1, to a single lead for coupling with one pole of a suitable power source, and it will be understood that a similar lead at the opposite end of the unit 10 will be joined to the other pole of the power source. The several heating elements 14 are, therefore, in parallel circuit and one or two of the heating elements could fail without completely disrupting the operation of the device. In normal heat treating cycles, particularly when ample insulation is provided over the heating element, the automatic control for maintaining desired temperatures and temperature changes calls for frequent switching on and off of power. Equipment of this sort generally has sufficient reserve heating capacity so that, in a normal heating cycle, the current will be off more than it is on. With this background, it can be visualized that failure of a single heating element in a bank of four heating elements in parallel circuit will permit continued operation by merely extending the time that the current is on to compensate for the loss of one heating source. This would apply if there were only three heating elements and one were to fail. When four or more heating elements are present, there could be failure of two spaced heating elements of the assemblage, with the possibility of still being able to complete a pre-arranged heating cycle. If two adjacent heating elements in an assemblage containing four or more such elements were to fail, it could still be possible to complete a pre-arranged heating cycle, provided the ceramic material of the members 16 was sufficiently heat conductive and the overlying insulation around the heating zone was sufficient to maintain substantial uniformity in the applied heat.

An important advantage of the new heating unit construction, in addition to being able to complete heating cycles in the event of partial apparatus failure, is that individual heating elements 14 can very easily be removed and replaced by merely loosening the appropriate anchoring members 31 in the junction boxes 13 at opposed ends of the unit, removing the damaged element 14, lacing a new element 14 through the parts, and securing the ends in the junction boxes 13 by retightening the anchoring members 31.

In a device of this type, which in use will be subjected to considerable rough handling in mounting the same on structures requiring heat treatment, and which when not in actual use may be carelessly handled, it is to be expected that there will be some breakage of the ceramic parts, although in practice they are found to be surprisingly rugged. When there is such breakage, however, it is very easy to completely disconnect a junction box 13 at the end nearest to the break, remove the broken or damaged parts and replace them with new ceramic bodies 16 or 24. Thus, unlike most conventional heating units for use in welding and allied heat treating where breakdown necessitates either complete replacement or difficult repair, the heating unit of the present invention can readily be maintained in functioning condition by anyone having available extra heating elements and extra ceramic bodies 16 and 24.

Various changes and modifications in the heating unit herein disclosed may occur to those skilled in the art and, to the extent that such changes and modifications are embraced by the appended claims, it is understood that they constitute part of the present invention.

I claim:

1. A heating unit of elongated flexible structure adapted for spiral wrapping around weld zones and structures to be heat treated, said heating unit comprising a plurality of juxtaposed ceramic bodies having aligned apertures receiving at least three closely spaced parallel flexible heating elements, abutting surfaces of said ceramic bodies having interfitting curvatures providing great flexibility longitudinally of the unit, said heating elements terminating in electrically insulating junction boxes at opposed ends of said unit, said junction boxes having adjustable means for individually and detachably coupling said heating elements therewith, and each of said junction boxes including other adjustable means for detachably joining electrical leads from one pole of a power source with said heating elements in parallel circuit.

2. A heating unit as defined in claim 1, wherein the ceramic bodies throughout the major portion of the length of said unit have high heat conducting properties, while ceramic bodies in end portions of said unit adjacent the junction boxes have heat insulating properties, and said junction boxes are of heat insulating material.

3. A heating unit as defined in claim 2, wherein the heat insulating ceramic bodies adjacent said junction boxes are of cylindrical bead-like structure receiving individual heating elements, thereby facilitating attachment and detachment of individual heating elements without disturbing the coupling of other heating elements with said junction boxes.

4. A heating unit as defined in claim 1, wherein said junction boxes each comprise a block of heat insulating material having a plurality of parallel electrically conductive metal tubes extending therethrough, one face of said block having a plurality of recesses extending perpendicularly to and spaced longitudinally of each of said tubes, each of said tubes having a plurality of threaded apertures coaxial with said recesses, and threaded anchoring means in each of said apertures with the actuating heads thereof exposed at but embedded in said recesses providing the means for individually and detachably securing said heating elements and power leads to said junction box.

5. A heating unit as defined in claim 4, wherein said electrically conductive metal tubes are of sufficient inner diameter to receive overlapped portions of said heating elements and power leads.

6. A heating unit as defined in claim 5, wherein there are at least three threaded apertures and anchoring means for each of said tubes with at least one of said apertures and anchoring means being positioned to register with overlapped portions of the engaged heating element and power lead.

7. A heating unit as defined in claim 1, wherein the ceramic bodies throughout the major heating portion of said unit are of substantially uniform dimension in two directions and much elongated in a third direction, with uniformly spaced apertures extending through one of the short dimensions thereof, opposed apertured surfaces of said bodies having corresponding concave and convex curvature throughout the length thereof permitting relative sliding movement between juxtaposed ceramic bodies to vary the common plane of said apertures in adjacent bodies, and between the heating portion of said unit and said junction boxes individual heating elements are enveloped by a series of bead-like cylindrical bodies of heat insulating ceramic material.

8. A heating unit as defined in claim 7, wherein opposed surfaces of said elongated ceramic bodies paralleling the apertures therein are substantially parallel to each other.

9. A heating unit as defined in claim 8, wherein said last named surfaces at at least one side of said unit have a slightly concave curvature extending throughout the length thereof providing increased surface contact in the spiral wrapping of said unit around cylindrical structures to be heat treated.

10. A heating unit as defined in claim 1, wherein flexibility of said unit permits spiral wrapping with either of the opposed elongated surfaces thereof in engagement with a structure to be heat treated, and surfaces of said ceramic bodies on at least one side of said unit being specially contoured to provide enhanced surface contact with particular structures to be heat treated.

* * * * *